Dec. 12, 1961    N. C. POEL ET AL    3,012,652
LIVE ROLLER CONVEYOR WITH SENSING
Filed Dec. 2, 1959    3 Sheets-Sheet 1
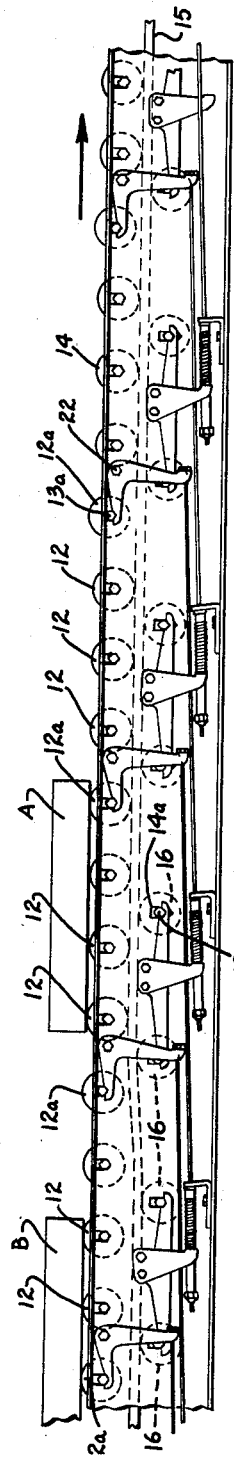
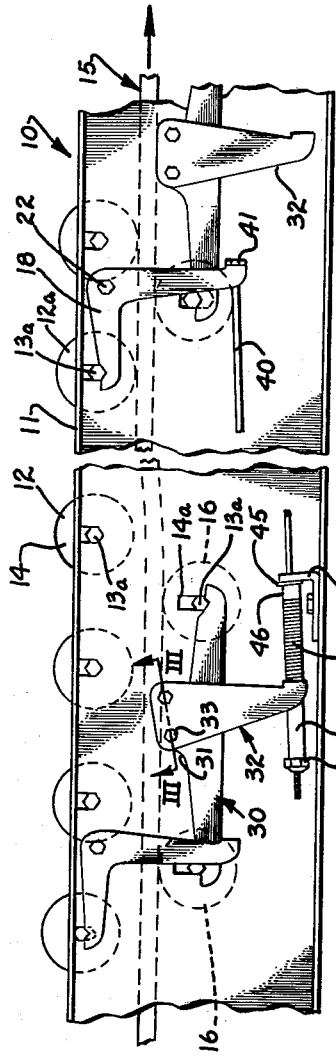
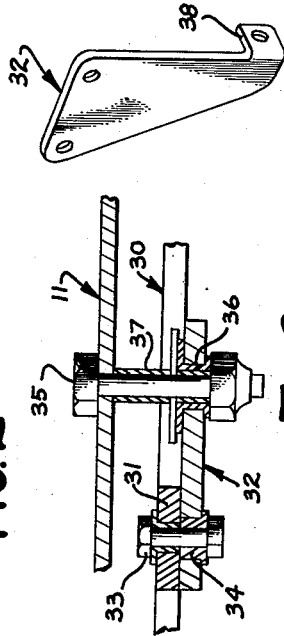
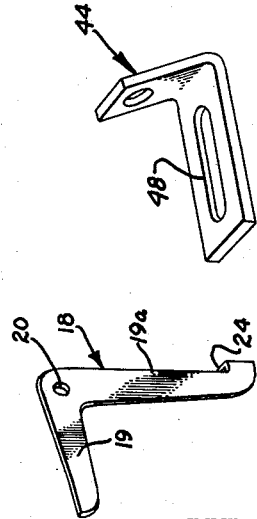
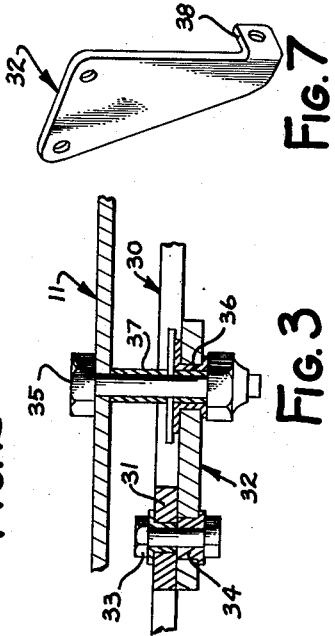
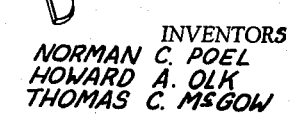
INVENTORS
NORMAN C. POEL
HOWARD A. OLK
THOMAS C. McGOW
BY *Price & Heneveld*
ATTORNEYS

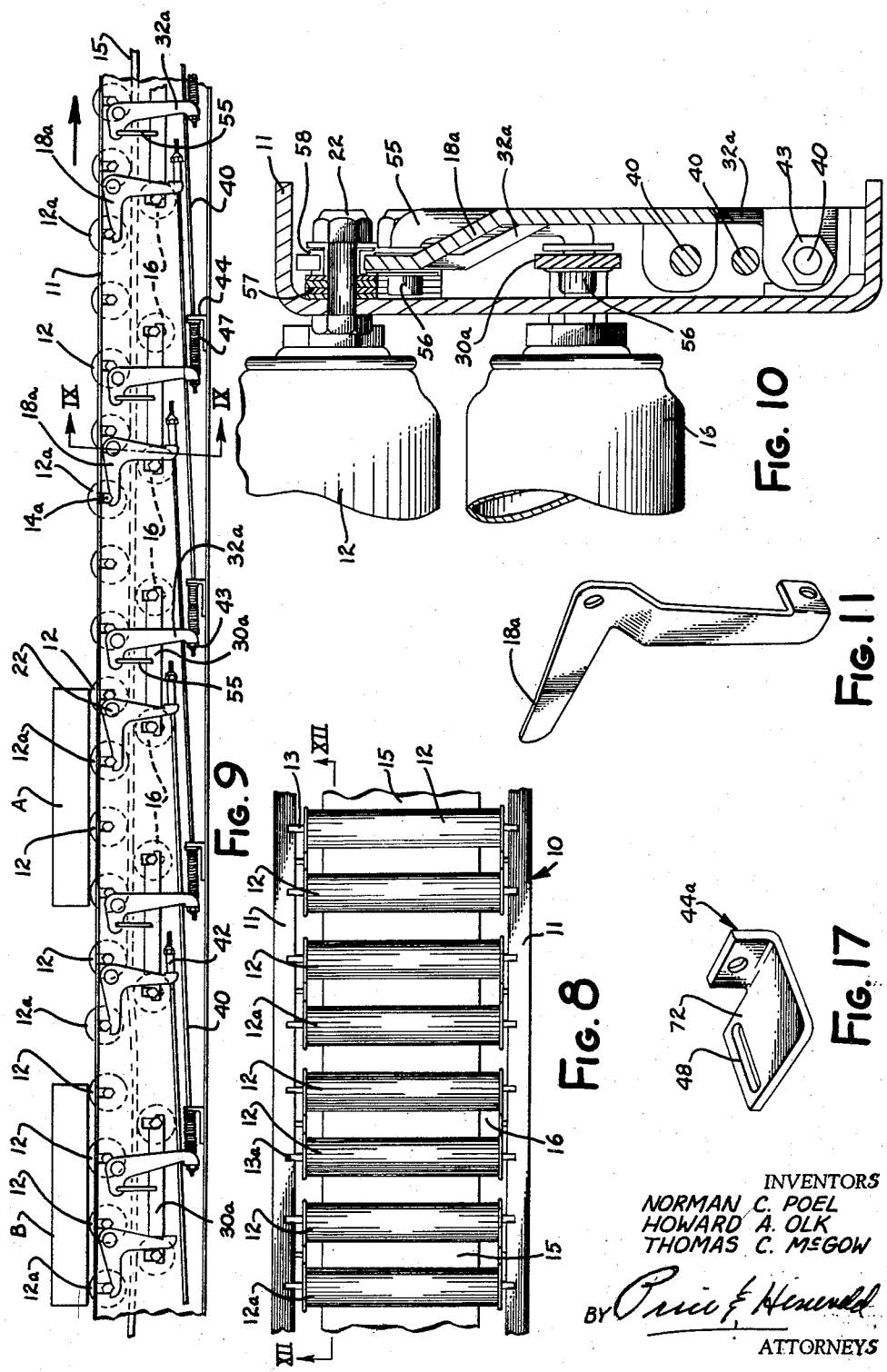

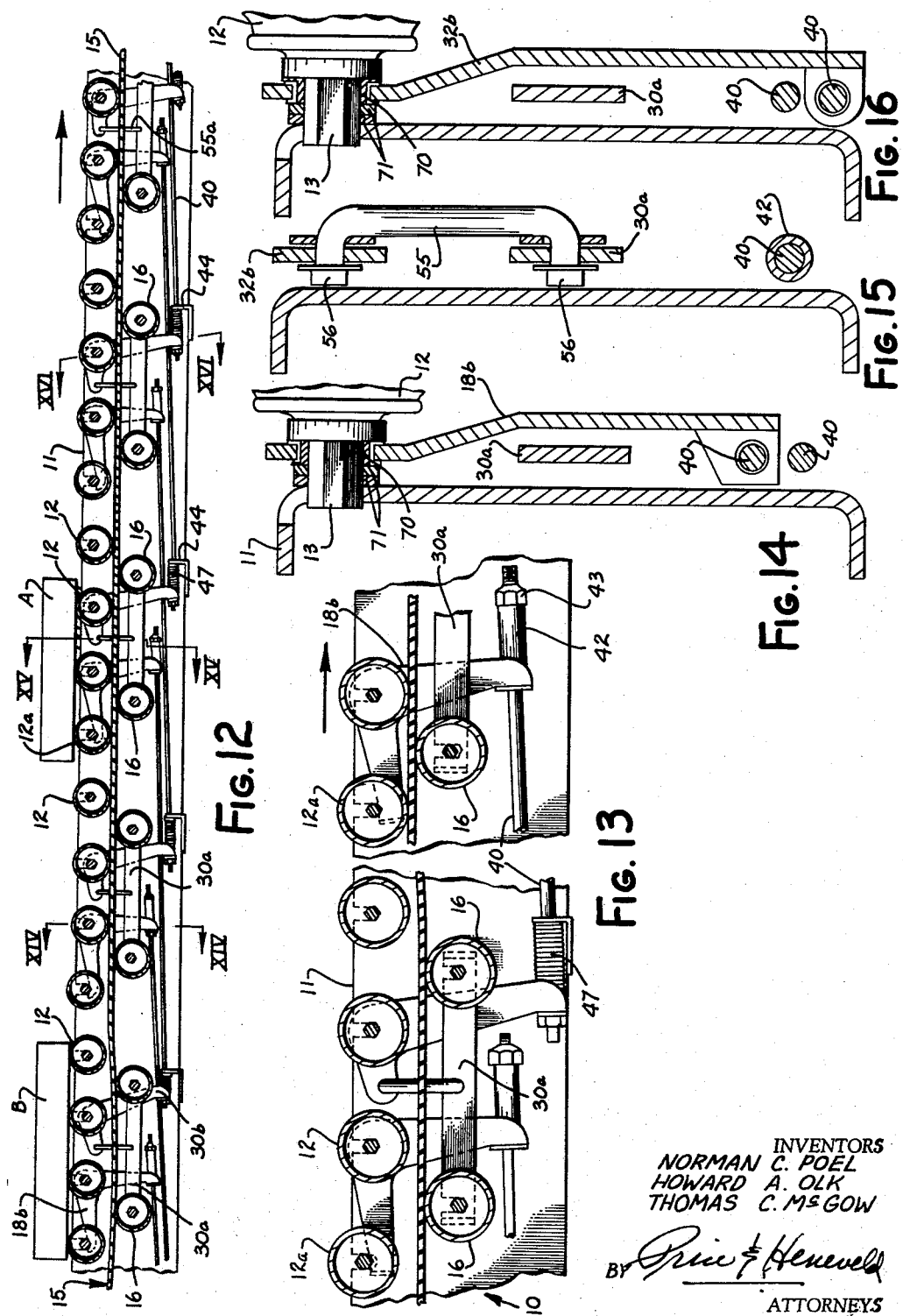

United States Patent Office 3,012,652
Patented Dec. 12, 1961

3,012,652
LIVE ROLLER CONVEYOR WITH SENSING
Norman C. Poel and Howard A. Olt, Grand Rapids,
Mich., and Thomas C. McGow, Convent, N.J., assignors to The Rapids-Standard Company, Inc., Grand
Rapids, Mich., a corporation of Michigan
Filed Dec. 2, 1959, Ser. No. 856,857
12 Claims. (Cl. 198—127)

This invention relates to conveyors and more particularly to a live roller conveyor equipped with means to permit efficient accumulation.

This application is a continuation-in-part of our copending application Serial No. 795,435, filed February 25, 1959, entitled Accumulator Conveyor.

Many types of articles, by reason of their configuration or their weight or for other reasons, cannot be transported on wheel type conveyors but must be transported on live roller conveyors. The term "live roller" conveyor means a conveyor in which the rollers forming the conveying surface are powered or driven positively. Thus, it is frequently necessary to accumulate articles on live roller conveyors. Such accumulation occurs normally by reason of intent, sometimes by reason of an accidental blockage on the conveyor line. An example of an instance where accumulation is intentional would be where articles approach a machine or other type of work station on a conveyor and must be separated one from another to pass through the machine. Another example is where there is some type of sweep off or gate which requires restraining the movement of articles until the articles ahead have cleared the next portion of the conveyor.

When this type accumulation occurs on conventional live roller conveyor, excessive drag is imposed upon the equipment by the stationary, accumulated articles. If the articles are heavy enough to stop the rotation of the live rollers, the drag or tension applied to the belt is multiplied many times. This is reflected in excessive loading of the belt driving mechanism including the prime mover. Rapid wear of the belt occurs and replacement of these belts is costly. Even though rotation of the live rollers is not stopped, very high loadings can be imposed upon the belt and its driving mechanism. Further, the continued rotation of the rollers results in severe wear and frequently appreciable damage to the articles themselves.

This invention provides a means by which the articles themselves automatically cause the propelling member to disengage the driving rollers, rendering them inoperative as propelling members. This prevents the build up of loads on the propelling member and thus on all of the power equipment required to drive the propelling member even though large numbers of stationary articles may be resting on the conveyor. Wear on the rollers, the propelling member and its related driving equipment is substantially reduced. Also, the possibility of injury to the articles is largely eliminated.

This purpose is accomplished without reducing the effectiveness of the conveyor as a transporting means. In fact, the mechanism permits a substantially higher degree of control of the amount of propelling force applied to the rollers because the belt or propelling member is rendered fully floating with the degree of pressure exerted by the propelling member on the driving rollers precisely adjustable in each of a number of short, successive zones along the conveyor track. The nature of the invention is such that it may be applied in a number of cases to existing equipment without interfering with the equipment's efficiency or with the safety feature of permitting the rollers to rise or "pop out" should personnel or articles accidentally come between the propelling member and the driving rollers.

The invention eliminates the necessity for manual observation of the equipment to avoid damage resulting from accumulation. The equipment operates entirely automatically and does so by exceedingly simple means. These means are both durable and dependable. The means are further not particularly affected by adverse operating conditions such as dirt, dust and the like which are often experienced in the working environment of this type conveyor.

These and other objects and purposes of this invention will be readily understood by those acquainted with the design and use of conveying equipment upon reading the following specification and the accompanying drawings.

In the drawings:

FIG. 1 is a fragmentary side elevation view of a conveyor equipped wth this invention;

FIG. 2 is a fragmentary broken enlarged side elevation view of the mechanism illustrated in FIG. 1;

FIG. 3 is an enlarged fragmentary sectional view taken along the plane III—III of FIG. 2;

FIG. 4 is an enlarged oblique view of a typical propelling pressure control bracket;

FIG. 5 is a fragmentary enlarged side elevation view of a typical shaft for one of the rollers;

FIG. 6 is an enlarged oblique view of a crank used in this invention;

FIG. 7 is an enlarged oblique view of a yoke lever used in this invention;

FIG. 8 is a fragmentary plan view of a typical conveyor to which this invention is applied;

FIG. 9 is a fragmentary side elevation view of a conveyor equipped with a modified form of this invention;

FIG. 10 is an enlarged sectional elevation view taken along the plane X—X of FIG. 9;

FIG. 11 is an enlarged oblique view of one of the rocking levers utilized in the structure illustrated in FIGS. 9 and 10;

FIG. 12 is a sectional elevation view of a conveyor taken along the plane XII—XII of FIG. 8 but showing the conveyor equipped with a further modified form of this invention;

FIG. 13 is an enlarged fragmentary broken sectional elevation view taken along the same plane as FIG. 12 and showing the same modified structure applied to the conveyor;

FIG. 14 is an enlarged sectional elevation view taken along the plane XIV—XIV of FIG. 12;

FIG. 15 is an enlarged sectional elevation view taken along the plane XV—XV of FIG. 12;

FIG. 16 is an enlarged sectional elevation view taken along the plane XVI—XVI of FIG. 12;

FIG. 17 is an oblique view of a modified anchor bracket employed with the embodiment illustrated in FIG. 12.

In executing the objects and purposes of this invention, there has been provided a live roller conveyor. The bed of this conveyor consists of rollers extending between the side rails of the conveyor bed. Certain of these rollers are slightly elevated above the remainder of the conveyor bed and act as sensing rollers. The rest of the rollers operate as the driving rollers. Beneath the rollers forming the top surface of the conveyor bed is a propelling member which is generally shown as a belt. This propelling member is supported from beneath against the bottom of the driving rollers forming the conveyor bed by pressure rollers. These pressure rollers are in turn so mounted that they may float vertically. The position of the pressure rollers is controlled by a linkage mechanism which is interconnected to the sensing rollers so that depression of the sensing rollers by an article passing over them results in lowering of the pressure rollers, permitting the belt to drop away and thus disengage the driving rollers. The linkage is so arranged that the disengagement between the belt or propelling member and the driving rollers occurs at a point somewhat upstream or rearwardly of the pressure roller which has been depressed by the article. This action results in de-activating the affected driving rollers so that any article resting on them will halt for lack of the exertion of a propelling force against it.

Referring to the drawings, and specifically to FIG. 8, the numeral 10 indicates a conveyor bed. The conveyor bed 10 has a pair of C-shaped channels forming side rails 11, the upper and lower flanges of which project outwardly from the conveyor. The conveying surface of the bed 10 is formed by a plurality of rollers 12 which extend laterally across the bed substantially its full width. The rollers are spaced preferably at uniform intervals along the conveyor bed. Each of the rollers 12 is supported on a shaft 13 about which it is freely rotatable. The ends of the shafts 13 project beyond both ends of the rollers and are seated in vertical slots 14 in the side rails (FIG. 2). Preferably the shafts 13 are non-circular and, as shown, are hexagonal so that they will lock against rotation in the slots 14. The slots 14 open through the top of the side rails 11 to permit the rollers to "pop out" of their slots 14 should some obstacle come between them and the belt or propelling member which contacts their lower surface. This particular construction of the rollers and the way they are secured to the conveyor bed are both conventional.

Beneath the rollers 12 is a propelling member 15. In the particular construction illustrated, this is a belt having a width substantially equal to that of the rollers 12. It will be recognized that within the scope of this invention the propelling member may be wide or narrow, depending upon the character of the usage to which the conveyor is to be put. The upper run of the propelling member 15 is supported by pressure rollers 16 spaced at intervals along the conveyor beneath the belt. In the particular construction illustrated, there are approximately half as many pressure rollers 16 as there are rollers 12 forming the transporting surface of the conveyor. The pressure rollers 16 are identical to the rollers 12 and are mounted in the same manner with their shafts 13a projecting through a slot 14a in the web of the side rails 11. In this type conveyor, means are provided to hold the pressure rollers 16 up beneath the propelling member 15 so that the propelling member is held in positive engagement with the bottoms of the driving rollers 12. Thus, the movement of the propelling member 15 is transmitted to the driving rollers 12 as the means of moving articles along the conveyor bed. The particular means for accomplishing this constitutes part of this invention and will be described in detail subsequently.

The propelling member 15 is endless and normally passes over a suitable pulley at each end of the conveyor. It has a return run beneath the pressure rollers 16 which return run is conventional and is not illustrated in the drawings. One of the pulleys over which the propelling member 15 passes is powered by any suitable means such as an electric prime mover and suitable speed reduction power train. This also is conventional and well-known in the art of conveyors and therefore is not illustrated.

It will be noted that certain of the rollers forming the conveying surface are elevated slightly above the remainder of the rollers. These rollers are the sensing rollers 12a (FIG. 1). The rollers 12, not so elevated, are designated the driving rollers. The ratio of driving rollers to sensing rollers may be varied according to the results desired. In the particular embodiments illustrated in FIGS. 1, 9 and 12, every fourth roller is a sensing roller 12a.

The sensing rollers 12a are rotatably mounted on shafts 13a identical to the shafts 13 for the rollers 12 except for the hereinafter described notches. Each of the ends of the shafts 13a on which the sensing rollers 12a are mounted has a shallow notch 17 in its lower face (FIG. 5).

The notch 17 provides a seat for one end of the crank 18. The crank 18 is generally L-shaped, as is best illustrated in FIG. 6. It has a horizontal arm 19 and a vertical arm 19a and has a hole 20 in the general area where the arms 19 and 19a join. The bottom of the arm 19a has a laterally extending ear 21 which is centrally apertured. The crank 18 is pivotally mounted to the web of the side rail 11 by a stud 22 (FIGS. 1 and 2). Suitable spacer means (not illustrated) are provided between the face of the rail 11 and the inner face of the crank 18 to space the crank from the face of the side rail and to avoid interference with other structure forming part of the support for the pressure rollers 16. The stud 22 is located at or slightly below the plane of the shaft 13, that is, near the top of the side rail 11. A pair of the cranks 18 are used to support each of the sensing rollers 12a, one at each end of the shaft 13a.

The pressure rollers 16 are arranged in pairs. The shafts 13a supporting each of the pressure rollers 16 project through the side rails 11 by reason of the slots 14a and are equipped with a notch 17. Extending between the shafts of each pair of associated pressure rollers 16 is a yoke 30. The yoke 30 has an upwardly extending projection 31, midway between its ends (FIGS. 2 and 3). The yoke in turn is supported by the yoke lever 32.

The lever 32 is generally triangular in shape, having its wide or base portion at the top. At one of the top corners of the yoke lever 32, it is connected to the yoke 30 by a bolt 33 which passes through the projection 31 of the yoke. The bolt is surrounded in both the yoke 30 and the yoke lever 32 by a suitable bushing assembly 34. The bushing assembly 34 assures free pivotal movement of the parts with relation to each other and prevents binding due to tightening of the bolt 33.

At its other upper corner, the yoke lever 32 is secured to the side rail 11 by a bolt 35. Where the bolt passes through the yoke lever 32 it is surrounded by a bushing assembly 36 serving the same purpose as the bushing assembly 34 about the bolt 33. Behind the yoke lever 32 is a conventional spacer 37 surrounding the bolt 35. The yoke 30 is supported solely by the yoke lever 32 so that rotation of the yoke lever 32 about the bolt 35 will result in vertical movement of the yoke 30. It will be recognized that a pair of the yokes 30 are used for each pair of pressure rollers 16, one on each side of the conveyor. The lower end of the yoke lever 32 has an apertured, inwardly turned lip 38 (FIG. 7). The purpose for this will appear more fully subsequently.

Each of the yoke levers 32 is connected to one of the cranks 18 by a tie rod 40. The tie rod 40 has a head 41 bearing against the forward face of the ear 21 of the crank 18 and slidably passes through the aperture in the lip 38 of the yoke lever 32. Rearward of the yoke lever 32, the rod 40 is surrounded by an elongated, sensing pressure control collar 42, one end of which bears against the rearward face of the lip 38 and the other end against the terminal nut 43 threaded on the end of the rod 40. Ahead of the yoke lever 32 a propelling pressure control bracket 44 is secured to the lower flange of the side rail 11. The rod 40 passes through and is freely slidable with relation to the bracket 44. Rearwardly of the bracket 44, the rod is surrounded by a washer 45, a spring seat spacer 46 and a compression spring 47. One end of the compression spring bears against the spacer 46 and the other end against the forward face of the lip 38.

The lower leg of the bracket 44 has an elongated slot 48 (FIG. 4), permitting adjustment of the bracket 44 longitudinally of the rod 40. Longitudinal adjustment of the bracket 44 determines the tension exerted by the spring 47 which in turn determines the amount of pressure exerted by the pressure rollers 16 against the propelling member 15. The further the bracket is moved rearwardly (that is, to the left as illustrated in FIGS. 1 and 2), the greater this pressure. Adjustment of the nut at the end of the rod 40 varies the height of the sensing roller 12a.

It will be noted from observation of FIG. 1 that the cranks 18 for one sensing roller 12a are not connected to the immediately rearward yoke lever 32 but to the second yoke lever 32 rearwardly of the crank. Thus, the operation of a pressure roller 12a does not affect the operation of the driving rollers 12 immediately rearward of it but affects the operation of the driving rollers 12 spaced a significant distance rearwardly or upstream. This arrangement is utilized so that the depression of a particular sensing roller 12a will not disengage the propelling member 15 from the rollers propelling the particular article resting on that sensing roller but will disengage the propelling member from the rollers driving the next article behind the one resting on the sensing roller. The exact operation of the device will be described subsequently.

FIGS. 9, 10 and 11 illustrate a modified form of this invention. Functionally the modified structure is identical to that illustrated in FIGS. 1–7. Structurally it is the same except for minor differences. Accordingly only the structural differences will be described.

The crank 18a is quite similar to the crank 18 except that its longer leg is offset to avoid interference with the yoke 30a (FIG. 11). The yoke 30a (FIG. 9) is similar to the yoke 30 except for the elimination of the projection 31. The yoke lever 32a is generally L-shaped and is materially longer than the yoke 32. It is pivotally mounted to the side rail 11 at a point almost in the same vertical plane as the stud 21 mounting the crank 18a. It, like the crank 18a, is offset to provide clearance for the yoke 30a (FIG. 10). The yoke 30a is connected to the short, generally horizontal leg of the yoke lever 32a by a hanger 55. The hanger 55 is of generally shallow U-shape, having one leg pivotally seated through a hole in the yoke 30a and the other leg pivotally seated through a hole in the yoke lever 32a. It is held against disengagement from these parts by snap-on terminal caps 56.

Proper spacing of the yoke lever 32a and the crank 18a from the face of the side rail 11 is maintained by spacer washers 57 (FIG. 10). Free rotation of the yoke lever and crank about their respective pivots is assured by the bushing assemblies 58.

The tie rods 40, and their mounting to the various parts of the structure, is the same except for the location of the sensing roller elevation control spacer 42 is ahead of the crank 18a rather than behind the yoke lever 32a. Also, the washer and spacer between the spring 47 and the bracket 44 are omitted.

The spacing between the sensing roller 12a and the pair of pressure rollers 16 to which it is connected through the linkage system is the same as in FIG. 1. That is, it is connected to pressure rollers spaced substantially rearwardly of the particular sensing roller. As will appear more fully under operation, the principle of operation of this structure is the same as that shown in FIGS. 1 and 2.

FIGS. 12 through 16 illustrate another form of this invention operating on the same principles as that illustrated in FIG. 1 except that the entire lever mechanism by which the pressure rollers and the sensing rollers are interconnected is mounted between the side rails 11 rather than exteriorly of them. The mechanism utilized in this particular is the same as that illustrated in FIGS. 9, 10 and 11. Therefore, only the variations in the structure will be described.

The crank 18b and yoke lever 32b are identical to those shown in FIG. 9 except for the use of a longer generally horizontal leg and an enlargement of the opening by which they are pivoted. The legs are lengthened to permit these parts to be pivotally mounted about the shafts 13 of the rollers 12. To permit the cranks 18b and levers 32b to pivot freely about the non-circular shafts, bushing assemblies 70 are provided. Proper spacing from the web of the side rails 11 is maintained by means of spacer washers 71.

Since the flanges of the side rails 11 project outwardly, the brackets 44a (FIG. 17) have a laterally projecting wing 72, permitting them to be adjustably mounted against the lower face of the side rail bottom flange.

*Operation*

The belt or propelling member 15 is designed to be powered and moving at all times when the conveyor is in use. In the particular structures illustrated, the propelling member is operated oppositely to the direction of the arrows shown in FIGS. 1, 2, 9, 12 and 13. The arrows in these figures indicate the direction of travel of the articles on the conveyor which, this being a live roller conveyor, is opposite from the direction of movement of the propelling member.

When the conveyor is in normal position, with no articles resting on it, the propelling member 15 contacts the undersurface of each of the driving rollers 12 but is disengaged from the sensing rollers 12a. The propelling member 15 is held in engagement with the driving rollers 12 by the pressure rollers 16, which are beneath the propelling member and act as an upward force, keeping it against the driving rollers 12 even though its weight normally biases the belt downwardly and out of engagement with these rollers.

The pressure rollers 16 are supported entirely by the yokes 30 or, in the case of the constructions illustrated in FIGS. 9 and 12, the yokes 30a. The yokes are biased upwardly by the springs 47 bearing against the lower end of the yoke levers 32 or 32a or 32b, as the case may be. As illustrated in FIGS. 1, 2, 9, 12 and 13, the springs 47 urge the lower end of the yoke levers to the left, raising the yokes so that the pressure rollers 16 are held firmly against the bottom of the propelling member 15 and the ends of their shafts 13a are raised a slight but significant distance above the lower ends of the slots in which they ride. The amount of upward pressure exerted by the pressure rollers 16 determines the degree of contact or force applied to the driving rollers 12 by the propelling member 15. The degree with which the pressure rollers 16 are biased upwardly is determined by the pressure exerted by the springs 47 and this in turn is determined by the position of the brackets 44 or 44a, as the case may be. The further the brackets 44 are moved to the left, the greater the upward pressure exerted by the pressure rollers 16. It will, thus, be seen that the pressure rollers 16 float entirely on the biasing force exerted by the springs 47.

At the same time, the pressure of the springs 47 biases the tie rods 40 to the left, as illustrated. This swings the cranks 17, 17a or 17b, as the case may be, to raise the sensing rollers 12a a slight but significant distance above the surface of the driving rollers 12. In doing this, the sensing rollers 12a are disengaged from the top surface of the propelling member 15. The height to which the sensing rollers 12a are raised above the plane of the top surface of the driving rollers 12 may be adjusted by tightening or loosening the nut 43 on the end of the tie rod 40. In the case of the construction illustrated in FIG. 1, this nut is located on the left end of the rod 40 and in the case of the constructions illustrated in FIGS. 9 and 12, it is located on the right end of the rod 40. In the construction illustrated in FIG. 1, this shifts the position of the tie rod with relation to the bracket 44 but does not affect the tension exerted by the spring 47. It does not affect the position of the pressure rollers 16 but does affect the vertical position of the sensing rollers 12a. In the constructions illustrated in FIGS. 9 and 12, this shifts the position of the cranks 18a or 18b with respect to the rod but not to affect the yoke levers 32a or 43b.

With reference to FIG. 1, it will be noted that the conveyor has packages A and B resting on its conveying surface. It will be noted also that the lead article A is resting on one of the sensing rollers 12a and has depressed it. It will be noted further that the next following article B is also resting on a sensing rollers 12a and on two additional driving rollers 12. The fact that the sensing roller 12a on which the package A is resting has been depressed has not affected the pressure rollers 16 supporting the belt in the area of package A. However, the pressure rollers 16 supporting the belt beneath package B are depressed, causing the belt to drop away from and disengage the driving rollers 12 and the sensing rollers 12a on which the package B is resting. Thus, forward motion of the package A will continue but package B will remain stationary until package A releases the sensing roller 12a on which it is resting. Thus, forward motion of the package B will be prevented until package A has cleared the sensing roller 12a on which it is resting, as illustrated in FIG. 1. It will be understood that as the packages progress along the conveyor bed they will successively depress or actuate one sensing roller 12a after another and as they do so they will be releasing other sensing rollers with the result that the zone of disengagement between the propelling member 15 and the driving rollers 12 will progress along the conveyor behind these packages, moving from one group of driving rollers 12 to another as one sensing roller 12a is actuated and another is released.

When the sensing rollers 12a are depressed by an article resting on them, they are brought into contact with the propelling member 15. Thus, they, at this point, become driving rollers along with the other rollers 12. In this manner the sensing rollers 12a, during the period they are depressed, become positive driving members moving the articles along the conveyor.

The vertical travel of the sensing rollers 12a need be only a very short distance. Thus, they do not have to be raised above the plane of the driving rollers 12 to such an extent that they hinder forward movement of the articles. This is possible because a very slight vertical movement of the pressure rollers 16 will effect engagement and disengagement of the propelling member 15 from the driving rollers 12. In the normal construction, a vertical travel of 0.015 of an inch is sufficient to effect complete disengagement between the propelling member 15 and the driving rollers 12. Thus, a vertical travel of the sensing rollers 12a of only 0.030 to 0.060 will be effective in operating this invention. This elevation of the sensing rollers is so slight that it will not impair the operation of the conveyor by impeding the forward movement of the articles over its surface.

The above description is equally applicable to all forms of the invention illustrated. Therefore, a detailed description of the operation of the modified forms of the invention illustrated in FIGS. 9 through 17 is considered unnecessary since it has been fully described in the above paragraphs.

It will be seen from this description that this invention employs the principles disclosed in our co-pending patent application Serial No. 795,435 entitled Accumulator Conveyor recited earlier. The principles of sensing the individual articles and using a mechanism responsive to this sensing to release the propelling force in a zone behind the article are incorporated in this invention. In both inventions the zone of release of the propelling force is caused to travel with the article.

It will be seen that this invention for the first time makes practical accumulation and singulation on a live roller conveyor. In cases of accumulation it relieves the propelling member 15 of the excessive loads which are imposed on the propelling member when a large number of articles pile up on the conveyor bed but, for some reason, their forward movement is obstructed despite the continued operation of the conveyor.

Also, the invention will automatically space articles a predetermined distance, one from another, moving along the conveyor. This feature is referred to as singulation and it has many applications in the conveyor field. It is highly desirable where the articles are being introduced into a work station or machine on the conveyor where they are to be processed. As an example, where the articles are to be individually weighed, stamped or sealed or to be sorted or to be directed to one of several conveyor lines, this invention will feed the articles, one at a time, to such a work station, automatically creating a gap between the articles so that the equipment at the work station may operate on each article individually without interference from the one following immediately behind it. Further, by singulating the articles on the conveyor, damage to the articles which may occur in an accumulation zone due to crushing of one article against another under the continued application of forward pressure by the conveyor is eliminated. This feature is particularly important where the articles are heavy such as cartons loaded with containers of liquids. These are but a few of the many advantages to be obtained by the use of this invention.

A preferred embodiment of the invention and two modified constructions for its application have been illustrated and described. It will be recognized that other modified forms of the invention may be constructed within the principles of the invention. All of these constructions which involve the principles of the invention are to be considered as included in the hereinafter appended claims unless these claims by their language expressly state otherwise.

We claim:

1. In a conveyor having a plurality of rotatable elements forming an article conveying surface; a powered propelling member and vertically movable support means beneath said propelling member holding said propelling member in driving engagement with said rotatable elements; means for detecting the presence of an article on said conveyor, said means being operatively connected to said support means for lowering said support means and the portion of said propelling member supported thereby in response to the presence of an article in contact with said means; said portion of said propelling member so lowered disengaging said rotatable elements.

2. A conveyor as recited in claim 1 wherein said means is spaced downstream of said conveyor from said operatively connected support means with respect to the movement of articles along said conveyor.

3. A conveyor as recited in claim 1 wherein there are a plurality of said support means spaced lengthwise of said conveyor and a plurality of said means spaced lengthwise of said conveyor; each of said means being operatively connected to one of said support means spaced upstream of said conveyor from said means with respect to the movement of articles along said conveyor.

4. A conveyor having a plurality of laterally disposed elongated rollers forming an article conveying surface; certain ones of said rollers being sensing rollers and the remainder of said rollers being propelling rollers, said propelling rollers all having their top surfaces in a common plane; said sensing rollers being normally elevated above said plane; a powered propelling member beneath said rollers; vertically movable supports beneath said propelling member spaced lengthwise of said conveyor and means biasing said supports against the lower surface of said propelling member and thereby said propelling member against said propelling rollers; each of said sensing rollers being operatively connected to one of said supports whereby when each of said sensing rollers is depressed to said plane of said propelling rollers its operatively connected support is lowered, permitting said propelling member, in the area adjacent the lowered support, to disengage said propelling rollers.

5. A conveyor as recited in claim 4 wherein each of said supports is spaced substantially upstream of its interconnected sensing roller with respect to the direction of movement of articles along said conveyor.

6. A conveyor having a plurality of laterally disposed elongated rollers forming an article conveying surface; certain ones of said rollers being sensing rollers and the remainder of said rollers being propelling rollers, said propelling rollers all having their top surfaces in a common plane; said sensing rollers being normally elevated above said plane; a powered propelling member beneath said rollers; vertically movable pressure elements beneath said propelling member spaced lengthwise of said conveyor and means biasing said pressure elements against the lower surface of said propelling member and said propelling member against said propelling rollers; said pressure elements being the sole support for said propelling member where said propelling member is beneath said propelling rollers; said sensing rollers being operatively connected to said pressure elements whereby when said sensing rollers are depressed to said plane of said propelling rollers said pressure elements are lowered, permitting said propelling member, in the area adjacent the lowered sensing elements, to disengage said propelling rollers.

7. A conveyor as described in claim 6 wherein each of said pressure elements is operatively independent of the others of said pressure elements and each of said sensing rollers is operatively connected to one of said pressure elements.

8. In a conveyor having a pair of spaced side rails and a plurality of elongated rollers forming an article conveying surface between said rails; a powered flexible member beneath said rollers; vertically movable pressure elements beneath said flexible member spaced longitudinally of said conveyor and means biasing said pressure elements against the lower surface of said flexible member and thereby said flexible member against said rollers; certain of said rollers being sensing rollers and operatively connected to said pressure elements and elevated above the remainder of said rollers whereby, when said sensing rollers are depressed to the level of the others of said rollers, said pressure elements are lowered, permitting said flexible member, in the area adjacent the lowered pressure elements, to disengage said other rollers.

9. In a conveyor having an article supporting surface, said surface having a plurality of rotatable elements; a powered propelling member beneath said elements; vertically movable pressure elements beneath said propelling member and supporting said propelling member upwardly against said rotatable elements whereby said rotatable elements are caused to rotate; certain of said rotatable elements being raised above the remainder of said rotatable elements and adapted for vertical movement; said raised rotatable elements being spaced apart lengthwise of said conveyor; said pressure elements being arranged in groups; means operatively connecting each of said raised rotatable elements to one of said groups of pressure elements whereby downward vertical movement of a raised rotatable element will lower its operatively connected group of pressure elements and said propelling member in the area of said group of pressure elements disengages the rotatable elements in said area.

10. A conveyor as recited in claim 9 wherein the group of pressure elements is spaced substantially upstream of its operatively connected raised rotatable element with respect to the direction of movement of articles along said conveyor.

11. In a conveyor having an article supporting surface, said surface having a plurality of rotatable elements; a powered propelling member beneath said elements; vertically movable pressure elements beneath said propelling member and supporting said propelling member upwardly against said rotatable elements whereby said rotatable elements are caused to rotate; vertically movable sensor means projecting above said rotatable elements; said sensor means being spaced apart lengthwise of said conveyor; said pressure elements being arranged in groups; means operatively connecting each of said sensor means to one of said groups of sensing elements whereby downward vertical movement of said sensor means will lower its operatively connected group of pressure elements and said propelling member in the area of said group of pressure elements disengages the rotatable elements in said area.

12. In a conveyor having a frame and an article supporting surface, said surface having a plurality of laterally disposed elongated driving rollers; a powered propelling member beneath said driving rollers; vertically movable laterally disposed elongated pressure rollers beneath said propelling member and supporting said propelling member upwardly against said driving rollers whereby said driving rollers are caused to rotate; said pressure rollers being arranged in groups; a pair of vertically movable yokes, one on each side of said conveyor supporting all of said pressure rollers constituting one of said groups; a pair of levers each having a generally downwardly extending first portion and a second portion extending generally lengthwise of said conveyor; said levers being pivotally connected to said frame, one on each side thereof; each of said levers being pivotally connected to one of said yokes and constituting the sole support for said yoke; sensing rollers interposed between certain of said driving rollers and raised above said driving rollers and adapted for vertical movement; said sensing rollers being spaced apart lengthwise of said conveyor; a pair of cranks, one pivotally mounted on each side of said conveyor; each of said cranks having a generally downwardly extending first portion and a second portion extending generally lengthwise of said conveyor; said cranks on their said second portion supporting one of said sensing rollers; means operatively connecting the lower ends of said second portions of said levers to the lower ends of said second portions of said cranks whereby downward movement of said sensing rollers causes said levers to lower said yokes and groups of pressure rollers permitting said propelling member in the area above said pressure rollers to disengage said driving rollers; one said sensing rollers and operatively connected group of pressure rollers constituting an operating unit, said conveyor having a plurality of said units each operatively independent of the others of said units.

No references cited.